Sept. 25, 1973 C. COX ET AL 3,761,303
METHOD FOR IMPREGNATING MICROCRACKS IN CHROMIUM PLATING
Filed Dec. 7, 1971
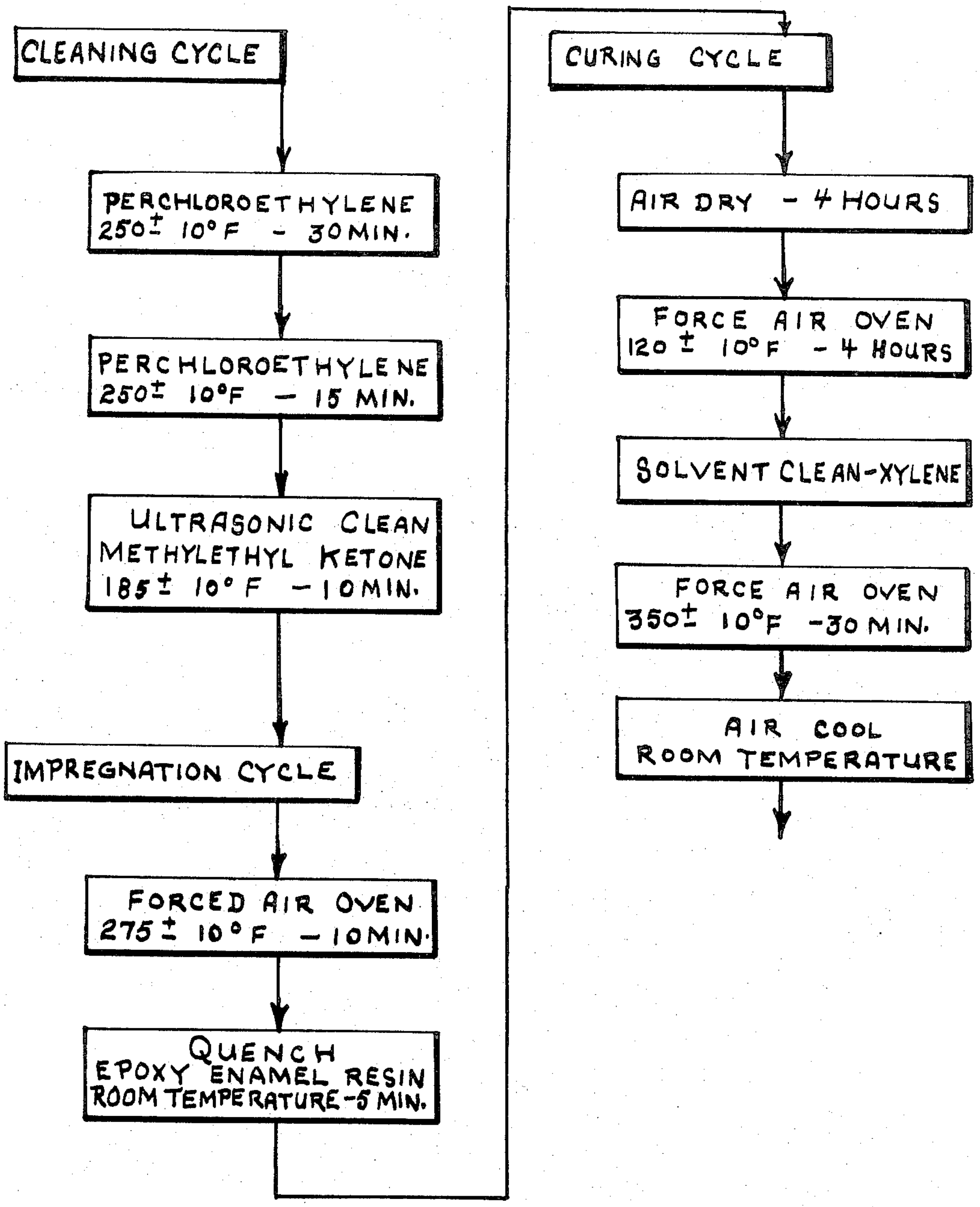
INVENTORS
CLINTON COX
JOHN PECHONICK Jr.
PETER ZYLSTRA Jr.
BY Harry A. Herbert Jr. and William J. O'Brien
ATTORNEYS United States Patent Office 3,761,303
Patented Sept. 25, 1973

3,761,303

METHOD FOR IMPREGNATING MICROCRACKS IN CHROMIUM PLATING

Clinton Cox, Cookeville, Tenn., and John Pechonick, Jr., Maryland Heights, and Peter Zylstra, Jr., Ferguson, Mo., assignors to the United States of America as represented by the Secretary of the Air Force Filed Dec. 7, 1971, Ser. No. 205,491
Int. Cl. C23f *17/00*
U.S. Cl. 117—71 M 2 Claims

ABSTRACT OF THE DISCLOSURE

A method for impregnating the microcrack surface pattern of chromium plated metal elements which includes heating the element, quenching the heated element in an epoxy resin maintained at room temperature to effect impregnation thereof and then curing the epoxy resin by heating the impregnated element.

BACKGROUND OF THE INVENTION

This invention relates to a method for impregnating the surface of a metal workpiece with a resinous material. More particularly, this invention concerns itself with a method for impregnating and sealing the microcrack surface pattern of a chromium plated metal workpiece with an epoxy resin.

Chromium plating is well known for its wear resistance and, as a result, it finds wide application as a structural material in the fabrication of cylinders, pistons and other elements utilized in hydraulic and pneumatic systems. However, the surfaces of chromium plating often exhibits a microcrack pattern which inhibits its usefulness in pressurized systems. The microcracks allow leakage of the pressurized fluids used in such systems thereby impairing their operational efficiency.

In attempting to overcome the microcrack surface problem associated with chromium plated metal elements, various methods for impregnating and sealing the surface cracks have been suggested. These methods, however, were not successful since they were costly, required specialized equipment, were not adaptable to mass production techniques and did not effectively seal the microcrack pattern.

With the present invention, however, it has been found that the microcrack problem encountered when utilizing chromium metal plate as a structural element has been overcome. The surfaces of chromium plated metal elements are effectively sealed with an epoxy resin by a process which, in brief, includes cleaning the plate, heating it and then quenching the hot chromium plated element in a cold epoxy resin.

SUMMARY OF THE INVENTION

In accordance with this invention, it has been found that the undesirable microcrack surface pattern inherently exhibited by chromium plated structural elements can be effectively sealed by a process which impregenates the microcracks with an epoxy resin. Briefly, the process of this invention includes the step of cleaning a chromium plated element with conventional solvents followed by the step of heating the plated element to a temperature ranging from about 265° F. to 285° F. The heated element is then quenched in an epoxy enamel resin to impregnate and seal the microcracks. It is essential that the resin be maintained at room temperature since the quenching of the hot chromium plated part in the cold resin is the unique concept that appears to provide the unexpected results achieved by this invention.

Accordingly, the primary object of this invention is to provide a process which can effectively seal the microcrack surface pattern of chromium plated metal elements.

Another object of this invention is to provide a surface sealing method for chromium plated metal elements that is economical, utilizes conventional processing equipment and lends itself to standard mass production manufacturing techniques.

The above and still other objects and advantages of the present invention will become readily apparent upon consideration of the following detailed description thereof when taken in conjunction with the accompanying drawing.

DESCRIPTION OF THE DRAWING

In the drawing:

The figure is a flow chart illustrating the process of this invention.

DESCRIPTION OF THE PREFERRED EMBODIMENT

The present invention encompasses a process for sealing the microcrack surface structure of chromium plated metal elements. The need for such a process arose because of the ineffectivenes of chromium plated metal parts when used in hydraulic and pneumatic systems. Chromium plated parts inherently have microcracks in the chromium deposit. These microcracks allow leakage of the pressurized fluids found in pressurized systems. This in turn impairs the usefulness of the chromium plated cylinders and pistons used in such systems. It was found, however, that the unique processing steps of this invention provided the means for effectively sealing the microcrack with an epoxy-type resin.

In general, the process includes a cleaning cycle, an impregnating cycle and a curing cycle. In the cleaning cycle, a chromium plated element, such as a piston, is solvent cleaned by immersion in hot perchloroethylene followed by ultrasonic cleaning in hot methylethyl ketone. The cleaned element then undergoes an impregnation cycle which includes heating the element then quenching it in an epoxy-type resin which has been maintained at room temperatures.

The epoxy resins found most suitable for the invention are those manufactured by Boydell Bros. and sold under the name Conchemco 17–102. They are chemically defined as one component thermally catalyzed epoxy resins.

After quenching, the impregnated element is cured by first drying it in air followed by an oven drying. Any excess resin is wiped off with xylene. The element is then oven cured followed by air cooling to room temperature to complete the process.

For the purpose of illustrating a specific embodiment of the invention, reference is made to the accompanying drawing which shows a process flow chart illustrating detailed steps of the invention. As illustrated by the flow sheet, a piston element was first cleaned by immersion in a container of perchloroethylene for 30 minutes at 250±10° F. It was then transferred to a second container of perchloroethylene and immersed for 15 minutes at 250±10° F. The two stage solvent cleaning step was then followed by ultrasonic cleaning in methylethyl ketone for 10 minutes at 185±10° F. After cleaning, the piston element was impregnated with an epoxy resin by first heating the element in a forced air oven until its temperature reached 275±10° F. for 10 minutes. Immediately thereafter without allowing the temperature of the element to drop below 260° F., it was quenched for 5 minutes at room temperature in Conchemco 17–102, an epoxy resin having a viscosity of about 0.7 to 1.5 centipoise and made by Boydell Bros. under the trade name Conchemco 17–

102. Excess resin was allowed to drain from the element and then it was air dried for four hours followed by forced air oven drying for four hours at a temperature of 120±10° F. Any further excess resin was wiped off the element with xylene and then the element was oven cured for 30 minutes at 350±10° F. The cured element was then air cooled to room temperature.

The process of this invention is especially effective in sealing the microcrack surface structure of chromium plated metal parts. The epoxy resin is compatible with hydraulic and pneumatic environments and it does not affect the utility of chromium plate. The process does not require expensive equipment and is adaptable to mass production techniques resulting in low cost per part treated. Although a precise explanation of the effectiveness of the process of this invention is not available, it is theorized that the unique concept of quenching the hot chromium plated part in the cold resin accounts for the unexpected results. Heating the part appears to cause expansion of the air present in the microcracks thereby forming a negative pressure. When the hot part is quenched, this negative pressure is equalized by the positive pressure of the cold resin being forced into the microcracks. This force is greater than the surface tension forces that preclude entry of resin by the conventional impregnation methods heretofore relied upon. This process may also be used to impregnate metal castings, powder metallurgy parts, or any other porous materials that require sealing. The corrosion protection afforded by chromium plating is greatly enhanced as a result of the impregnation process of this invention.

While the principle of this invention has been described with particularity, it should be understood that various alterations can be made without departing from the spirit of the invention the scope of which is defined by the appended claims.

What is claimed is:

1. A method for impregnating the microcrack surface pattern of a chromium plated metal element which comprises the steps of (A) immersing said element in a solvent for a period of time and at a temperature sufficient to clean said element;

(B) heating said cleaned element to a temperature of of from about 265° to 285° F. and then quenching said heated element in a curable epoxy enamel resin maintained at room temperature for a period of about five minutes to impregnate the microcrack surface pattern of said element with said resin;

(C) curing said resin impregnated element according to a curing cycle wherein said resin impregnated element is (a) air dried at room temperature for about four hours, (b) oven dried at a temperature of about 110° to 130° for about four hours, (c) wiped with solvent, (d) oven cured at a temperature of about 340° to 360° F. for about thirty minutes; and (D) cooling said element to room temperature to effect a complete cure of said resin.

2. A method in accordance with claim 1 wherein said element is immersed for 30 minutes in a first bath of perchloroethylene followed by immersion for 15 minutes in a second bath of perchloroethylene, both baths being maintained at a temperature of from about 240° to 260° F.

References Cited

UNITED STATES PATENTS

| | | | |
|---|---|---|---|
| 3,113,845 | 12/1963 | Uchida et al. | 204—38 E X |
| 3,341,348 | 9/1967 | Letendre | 117—71 M X |
| 3,617,349 | 11/1971 | Prasse | 117—71 M |
| 3,091,549 | 5/1963 | Kanter | 117—75 |
| 1,872,614 | 8/1932 | Wirshing et al. | 117—71 M X |
| 3,054,649 | 9/1962 | Arnold et al. | 117—71 M X |
| 3,245,577 | 4/1966 | Virzi | 204—38 E X |
| 3,279,936 | 10/1966 | Forestek | 204—38 E X |
| 3,345,202 | 10/1967 | Kiss et al. | 117—71 M |
| 3,526,486 | 9/1970 | Smith et al. | 204—38 E X |

ALFRED L. LEAVITT, Primary Examiner

J. R. BATTEN, Jr., Assistant Examiner

U.S. Cl. X.R.

29—195; 117—75, 102 R; 204—38 E